MODULATED ULTRA HIGH FREQUENCY SIGNAL GENERATOR

Filed Sept. 28, 1945 2 Sheets-Sheet 1

INVENTOR
CLARENCE C. LUNDY
BY Herbert H. Thompson
his ATTORNEY.

Jan. 17, 1950 C. C. LUNDY 2,494,568

MODULATED ULTRA HIGH FREQUENCY SIGNAL GENERATOR

Filed Sept. 28, 1945 2 Sheets-Sheet 2

INVENTOR
CLARENCE C. LUNDY
BY
Herbert A. Thompson
his ATTORNEY.

Patented Jan. 17, 1950 2,494,568

UNITED STATES PATENT OFFICE 2,494,568

MODULATED ULTRA HIGH FREQUENCY SIGNAL GENERATOR

Clarence C. Lundy, Bayonne, N. J., assignor to The Sperry Corporation, a corporation of Delaware Application September 28, 1945, Serial No. 619,120

7 Claims. (Cl. 250—36)

The present invention relates to the generation of ultra high frequency signals, and is particularly concerned with the production of modulated ultra high frequency signal energy.

In the construction of ultra high frequency signal generating apparatus, it is customary to provide an oscillation generator with a direct voltage supply, which usually takes the form of an expensive rectifier and filter system. Particularly in the construction of signal generators employing a Klystron such as a reflex Klystron, it has heretofore been considered necessary to provide an extremely well filtered power supply of stable voltage characteristics, to insure stable operation of the Klystron at a selected oscillation mode and to prevent appreciable frequency modulation of the Klystron.

Where it is required that the ultra high frequency signal be pulse modulated, a pulse signal generator has usually been incorporated as a modulator for use in conjunction with a Klystron having a highly filtered power source. It will be readily appreciated that a modulated signal generator based upon the foregoing practice usually is expensive, and is necessarily a relatively large unit.

An object of the present invention is to provide a simple, economical and compact ultra high frequency signal generator.

A further object is to provide a simple and economical modulated ultra high frequency signal generator of good frequency stability.

In accordance with the present invention, an alternating voltage supply is employed to vary the accelerating potential of a reflex Klystron throughout an appreciable range which extends slightly above the minimum accelerating potential corresponding to a selected mode of oscillation of the reflex Klystron. A voltage source is provided for regulating the reflector potential of the Klystron in such a way that the optimum reflector potential for the selected mode of oscillation is provided when the electron beam accelerating voltage has reached the minimum value for oscillation in the selected mode, and so that the reflector potential varies in accordance with the selected mode curve during the interval of each alternating voltage cycle during which the accelerating potential exceeds the minimum value for oscillation in the selected mode. A simple and inexpensive half-wave rectifier and a capacitor may be employed in conjunction with the electron beam accelerating voltage supply, for fixing the average potential of the reflector electrode at such a value that cophasal modulation of the reflector potential and the accelerating voltage achieves the above-described optimum relative voltage conditions.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

The foregoing objects and general description of the present invention will be made clear by reference to the detailed description of the present invention taken in conjunction with the drawings, wherein.

Figure 1:
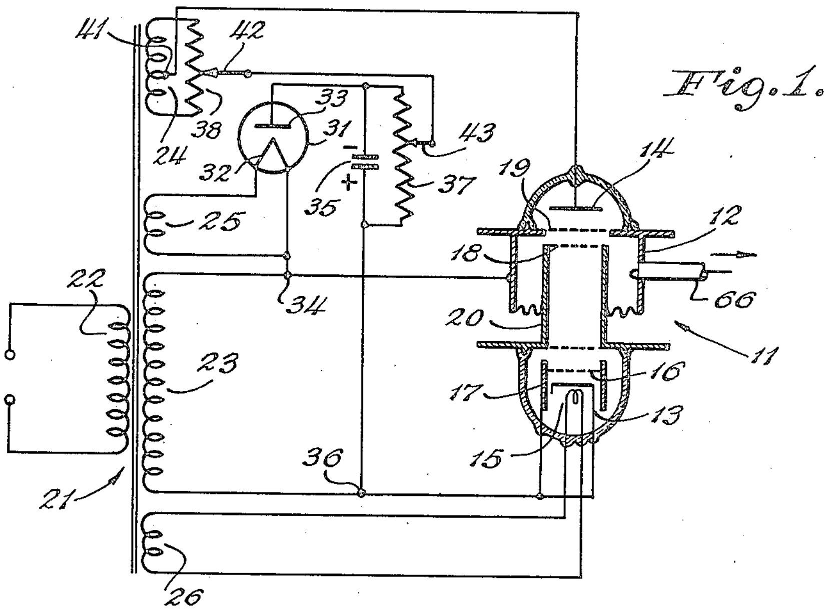
Fig. 1 is a schematic diagram of a signal generator constructed in accordance with the present invention.

Referring now to Fig. 1, there is shown a reflex Klystron 11 including a cavity resonator 12, a cathode 13 and a reflector electrode 14. The cathode 13 is heated by a heater winding 15 and, in cooperation with a control grid 16 and focussing electrode 17, is arranged to direct a stream of electrons through drift tube 20 and resonator 12 toward the reflector electrode 14 when the resonator 12 is at an appreciable positive accelerating potential with respect to cathode 13. The electron beam directed toward reflector electrode 14 is repelled by a negative potential applied to this electrode, so that the electrons are returned through the resonator 12 toward the cathode 13.

Figure 2:
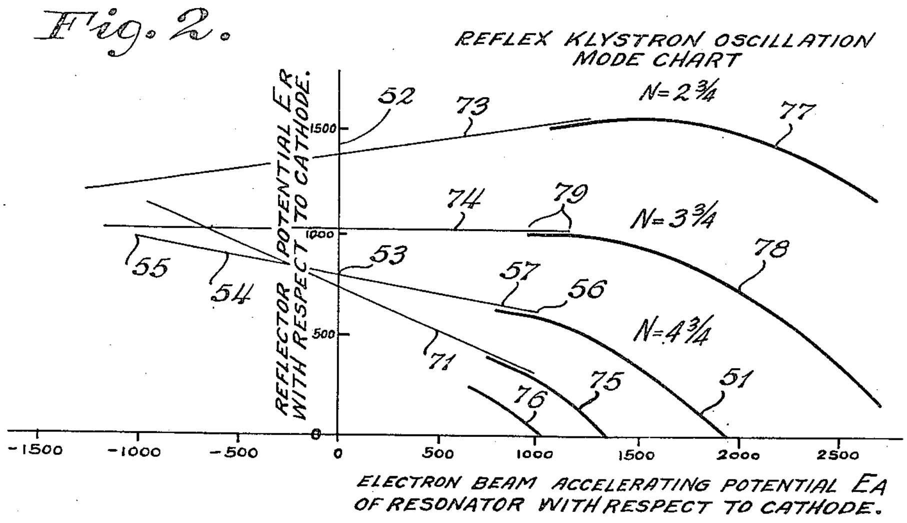
Fig. 2 is a graph showing the relative values of reflector potential and electron beam accelerating potential corresponding to five modes of oscillation of a typical reflex Klystron.

When the simultaneous values of the potential of reflector electrode 14 with respect to cathode 13 and the potential of resonator 12 with respect to cathode 13 determine a point coincident with one of the oscillation mode curves in the chart shown in Fig. 2, ultra high frequency oscillations are generated in the resonator 12. The oscillations in the resonator 12 velocity modulate the electrons passing through the space between the resonator grids 18 and 19 toward reflector electrode 14, and the velocity modulation of the electrons results in "bunching" of the electron stream repelled by reflector 14 back through the space between grids 19 and 18 toward the cathode. The bunched electrons passing through the space between grids 19 and 18 toward the cathode of the reflex Klystron 11 deliver ultra high frequency energy to resonator 12 in such a way as to sustain oscillations in the resonator throughout the time during which the reflector electrode potential and the electron beam acceleration potential remain consistent with an oscillation mode curve of the chart shown in Fig. 2.

As illustrated in Fig. 1, a transformer 21 having a primary winding 22, high-voltage secondary windings 23 and 24 and low-voltage secondary windings 25 and 26 is arranged to supply power to the circuits of the Klystron 11. The principal high-voltage secondary winding 23 is connected between the cathode 13 and the resonator 12 for providing an alternating electron-accelerating voltage of predetermined amplitude. The low-voltage secondary winding 26 is connected to the heater 15 for maintaining the cathode 13 at such a temperature as is required for adequate electron emission. The grid 16 and focussing electrode 17 may be connected to the cathode 13.

A rectifier 31 having a directly heated cathode or filament 32 and an anode 33 is connected between high-voltage secondary terminal 34 of the winding 23 and a capacitor 35 which, in turn, is connected to the other high-voltage terminal 36 of secondary winding 23. The filament 32 of the rectifier 31 is connected across low-voltage secondary winding 25 of transformer 21 for maintaining the filament in a condition of electron emissivity. By virtue of the connection of the series circuit including rectifier 31 and capacitor 35 between the terminals 34 and 36 of high-voltage secondary winding 23, a substantially constant voltage nearly equal to the peak output voltage of the winding 23 is developed across capacitor 35. This voltage is provided for biasing the reflector electrode 14 to a high average negative potential with respect to the cathode 13. A potentiometer 37 connected across capacitor 35 may be provided for adjusting the average negative potential of reflector 14 to any desired value.

The center-tapped high-voltage secondary winding 24 on the transformer 21 may be connected across a potentiometer 38, for producing an alternating voltage cophasal with the voltage of resonator 12 with respect to cathode 13. The center tap terminal 41 of secondary winding 24 may be connected to the reflector electrode 14, and the movable arm 42 of the potentiometer 38 may be connected to the movable arm 43 of potentiometer 37, so that the alternating voltage produced between terminal 41 and arm 42 is added to the direct voltage between cathode 13 and the arm 43 of the reflector bias supply.

With reference now to Fig. 2, let it be assumed that the oscillation mode represented by the curve 51 is the mode selected for the operation of the reflex Klystron 11. It will be noted that the minimum electron beam accelerating potential at which the reflex Klystron will operate in this mode is of the order of 800 volts, and that the reflector potential accompanying this electron beam accelerating potential must be of the order of 600 volts. From the slope of the extreme left-hand portion of curve 51 it is seen that the potential difference between the reflector and the cathode must be decreased gradually as the electron beam accelerating potential is increased, in order that the optimum relative values of reflector voltage and beam acceleration voltage be maintained for the oscillation mode represented by this curve.

According to curve 51, for optimum performance in this oscillation mode over an appreciable range of electron beam accelerating potentials, as for example from 800 volts to 1600 volts, a non-linear relationship would be required between the reflector potential variations and the electron beam accelerating potential variations. However, for a very narrow range of variation of the electron beam accelerating potential within the region above 800 volts as, for example, for the range between 800 volts and 1000 volts accelerating potential, the relationship of reflector potential variation and electron beam accelerating potential variation is substantially linear.

In accordance with the present invention, the alternating voltage applied between cathode 13 and resonator 12 is of an amplitude only slightly greater than the minimum accelerating potential for operation in the chosen mode, e. g., the mode represented by curve 51. If the minimum accelerating potential for which oscillation occurs in accordance with mode curve 51 is 800 volts, the amplitude of the alternating voltage supplied by transformer secondary winding 23 (Fig. 1) may be of the order of 900 volts or 1000 volts.

Since the portion of the curve 51 in the region representing electron beam accelerating potentials between 800 volts and 1000 volts is substantially linear, a straight line 54 may be drawn tangent to this portion of curve 51, the line 54 being effectively a linear extension to the left of this portion of curve 51. Line 54 intersects the ordinate axis 52 in a point 53, which represents the average bias voltage which should be applied to reflector electrode 14, and extends equal distances to the left and right of the ordinate axis 52. As illustrated in Fig. 2, the average reflector bias voltage value may be of the order of 780 volts for the linear extension 54 of curve 51, indicating that the movable arm 43 should be adjusted to a position on the resistor element of potentiometer 37 (Fig. 1) at which it is maintained at a negative potential difference of 780 volts from cathode 13.

If the reflector electrode potential and the electron beam accelerating potential recurrently are varied simultaneously along the straight line 54 between the limits 55 and 56, ultra high frequency oscillations will be produced by the Klystron 11 during the variation of these potentials in the region between the limit 56 and the point 57 corresponding to the minimum accelerating voltage end of the curve 51. Furthermore, since the portion of line 54 between points 56 and 57 is substantially coincident with the coextensive portion of the curve 51, the Klystron oscillates strongly with good frequency stability during the variation of the reflector potential and the beam accelerating potential through this region.

In accordance with the present invention, a direct voltage of value represented by the height of the intersection point 53 on the ordinate axis 52, is added to an alternating voltage of amplitude represented by the vertical component of the distance between point 53 and either end 55 or 56 of the line 54, and the sum voltage thus produced is applied to the reflector electrode 14. Referring to Fig. 1, the alternating voltage component of reflector voltage is supplied by the secondary winding 24 in cooperation with potentiometer 38, and the direct reflector voltage component is provided by the rectifier 31, the capacitor 35 and potentiometer 37 in conjunction with high-voltage winding 23.

The line 54 in Fig. 2 represents the locus of simultaneous values of the reflector potential $E_R$ and the accelerating potential $E_A$. The height of mid-point 53 of line 54 represents the direct component of the reflector voltage, the vertical extent of the line from mid-point 53 represents the amplitude of the reflector alternating voltage component, and the horizontal extent of the line 54 from ordinate axis 52 represents the amplitude of the accelerating voltage.

Figure 3:
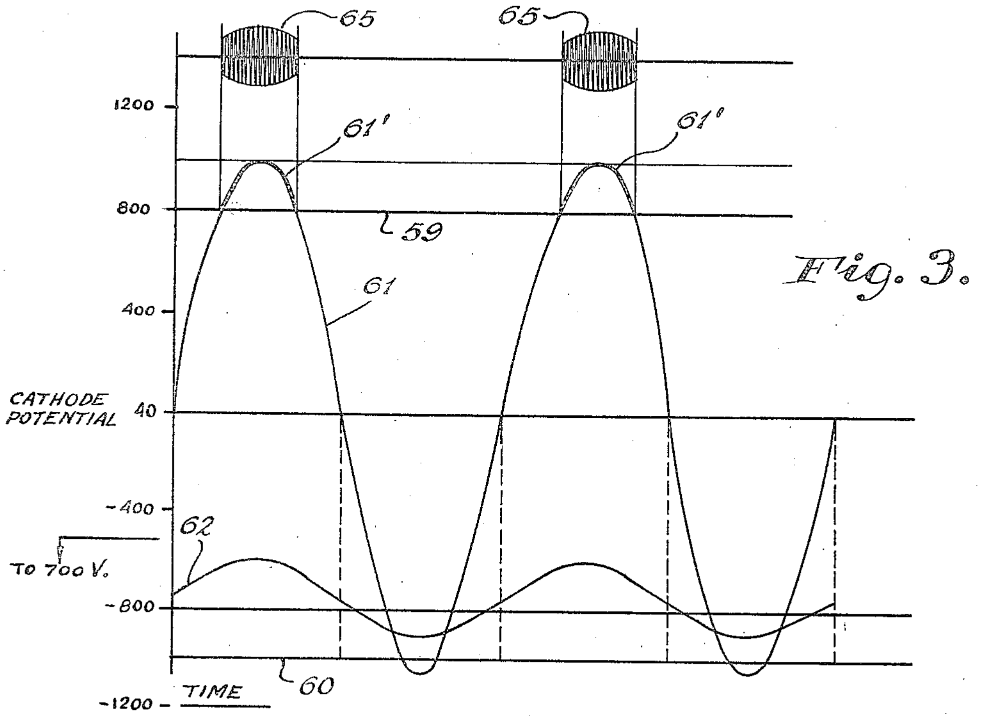
Fig. 3 is a graph illustrating the time variation of the electron accelerating potential of a reflex Klystron, the time variation of reflector potential with respect to the cathode, and the time variation of output voltage of the reflex Klystron.
Figure 4:
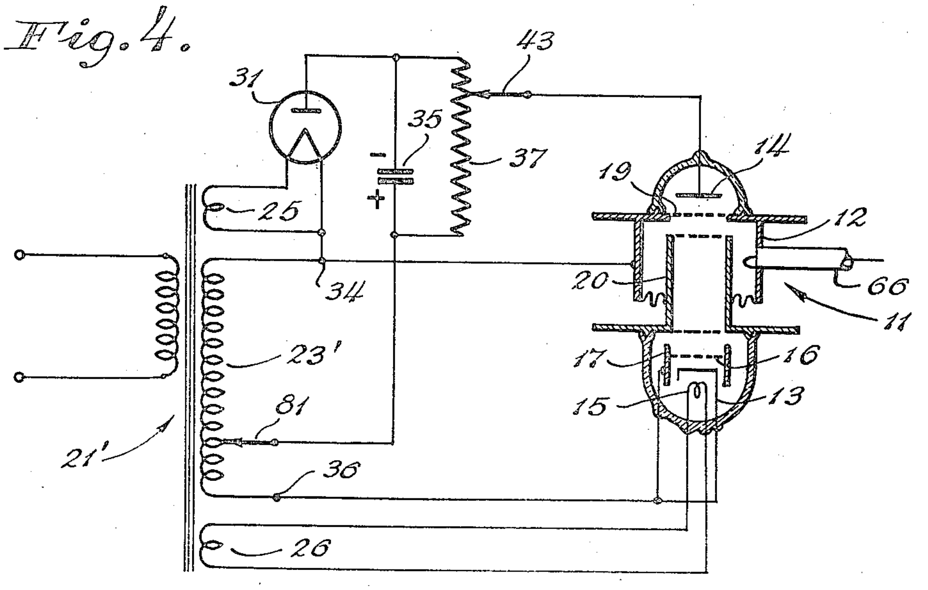
Fig. 4 illustrates a slightly different embodiment of the modulated signal generator constructed in accordance with the present invention.

In Fig. 3 is shown a group of curves based on a common time variation scale, and indicating the relative variation of beam accelerating potential and reflector potential in accordance with the line 54 in Fig. 2. Curve 61 represents the variation of potential of the resonator 21 with respect to the cathode 13, while curve 62 represents the variation of potential of reflector electrode 14 with respect to the cathode 13. Curve 62 represents the sum of a negative direct voltage component of the order of 780 volts and an alternating voltage component cophasal with the alternating voltage curve 61 and of an amplitude which may be of the order of 150 volts. The direct voltage produced a brief interval at the positive peak of each alternating voltage cycle, the Klystron oscillator 11 produces recurrent output pulses of ultra high frequency energy. Such pulses are suitable for testing radar equipment, or other uses where modulated ultra high frequency energy is required. By the coordination of reflector potential with the accelerating potential according to a selected oscillation mode, the oscillator is made to give stable pulse-modulated ultra high frequency signals without the expense of a high-power rectifier and filter system for accelerating voltage, or of a pulse modulation oscillator, such as have been used in the past in conjunction with Klystron oscillators.

The reflex Klystron oscillator chart in Fig. 2, shows that the potentials of the reflector electrode 14 and the resonator 12 with respect to the cathode 13 may be varied simultaneously along any other of several linear loci, e. g., along line 71, line 73 or line 74, for operating the Klystron in accordance with a selected oscillation mode curve 75, 77 or 78. The last-mentioned curve 78 may, for a selected reflex Klystron tube, have a small horizontal portion 79 at the minimum accelerating potential end thereof, such that the locus 74 of optimum resonator and reflector electrode potential variation is made horizontal. Accordingly, a constant voltage, here illustrated as of the order of 1000 volts, applied between the reflector 14 and the cathode 13 is for the reflector electrode. The sinusoidal variation of accelerating potential of the Klystron 11 through the region 79 of the curve 78 is unaccompanied by potential variation of the reflector electrode in this special case.

If a selected Klystron is characterized by a horizontal terminal portion 79 of the potential curve 78 representing the selected mode of operation, the potentiometer arm 42 may be adjusted midway between the resistance end terminals of the potentiometer 38, to provide zero alternating voltage between the arm 42 and the center tap terminal 41, or the winding 24 and potentiometer 38 may be dispensed with entirely for this cathode 13. The voltage produced across the capacitor 35 is substantially equal to the alternating voltage between the tap 81 and the terminal 34. Accordingly, the tap 81 is first adjusted on the transformer winding 23' to provide an alternating voltage component of amplitude indicated by the vertical extent of the desired operating locus, such as locus 54, for example, and thereafter the movable arm 43 of potentiometer 37 is positioned to add the required direct voltage component indicated by the height of the locus mid-point, e. g., point 53 in Fig. 2.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A stable generator of recurrent-pulse-modulated ultra high frequency signals comprising: a reflex Klystron having a cathode, a resonator and a reflector electrode, and being capable of operating in a plurality of oscillation modes each characterized by an ascertainable curve of optimum negative reflector potential versus accelerating potential, each of said curves being terminated at a point representing a minimum electron accelerating potential for which oscillations are produced; alternating voltage supply means connected between said cathode and said resonator for periodically sweeping the electron accelerating potential of said Klystron up to and slightly above the minimum accelerating potential of a selected mode curve; and means for synchronously varying the potential of said reflector electrode according to the optimum negative potential difference with respect to said cathode determined by said mode curve during said accelerating potential sweeps above said minimum accelerating potential.

2. Apparatus for generating recurrent pulses of ultra high frequency signals, comprising: a reflex Klystron having a cathode, a resonator and a reflector electrode, and being capable of operating in an oscillation mode characterized by an ascertainable curve of reflector potential versus accelerating potential, said curve being terminated at a point representing a minimum electron accelerating potential for which oscillations are produced in said mode; alternating voltage supply means connected between said cathode and said resonator for periodically sweeping the electron accelerating potential of said Klystron up to and slightly above said minimum accelerating potential; and means biasing said reflector at negative potential with respect to cathode and varying the potential of said reflector electrode synchronously with the variation of the accelerating potential for maintaining optimum relative values of accelerating potential and reflector electrode potential for oscillation in said mode.

3. Apparatus for generating recurrent pulses of ultra high frequency signals, comprising: a reflex Klystron having a cathode, a resonator and a reflector electrode, and being capable of operating in an oscillation mode characterized by an ascertainable curve of reflector potential versus accelerating potential, said curve being terminated at a point representing a minimum electron accelerating potential for which oscillations are produced in said mode; an alternating voltage source connected between said cathode and said resonator, said alternating voltage source being arranged for supplying an accelerating voltage having an amplitude slightly in excess of said minimum accelerating potential; and means for maintaining said reflector electrode at negative potential with respect to said cathode, said negative potential being of the order of magnitude of the amplitude of said alternating voltage applied between said cathode and said resonator.

4. Apparatus for generating recurrent pulses of ultra high frequency signals, comprising: a reflex Klystron having a cathode, a resonator and a reflector electrode, and being capable of operating in an oscillation mode characterized by an ascertainable curve of reflector potential versus accelerating potential, said curve being terminated at a point representing a minimum electron accelerating potential for which oscillations are produced in said mode; means for supplying between said cathode and said resonator an alternating voltage of amplitude greater than said minimum accelerating potential; and means for applying to said reflector electrode with respect to said cathode a voltage comprising a negative direct voltage component of the order of magnitude of said minimum accelerating potential and an alternating voltage component cophasal with the alternating voltage applied between said cathode and said resonator, the amplitude of said alternating voltage component and the magnitude of said direct voltage component being regulated relative to the alternating voltage between said cathode and said resonator for maintaining instantaneous values of accelerating potential and reflector potential at optimum values for said mode of oscillation.

5. Apparatus for generating recurrent pulses of ultra high frequency signals, comprising: a reflex Klystron having a cathode, a resonator and a reflector electrode, and being capable of operating in an oscillation mode characterized by an ascertainable curve of reflector potential versus accelerating potential, said curve being terminated at a point representing a minimum electron accelerating potential for which oscillations are produced in said mode; means for supplying between said cathode and said resonator an alternating voltage of amplitude in excess of said minimum accelerating potential; a rectifier and a filter connected in series across at least a portion of said alternating voltage supplying means for producing a direct voltage component of the order of magnitude of said alternating voltage; and means for coupling said filter to said reflector electrode.

6. Apparatus for generating recurrent pulses of ultra high frequency signals, comprising: a reflex Klystron having a cathode, a resonator and a reflector electrode, and being capable of operating in an oscillation mode characterized by an ascertainable curve of reflector potential versus accelerating potential, said curve being terminated at a point representing a minimum electron accelerating potential for which oscillations are produced in said mode; a transformer having a winding connected between said cathode and said resonator for supplying therebetween an alternating voltage of amplitude in excess of said minimum accelerating potential; and rectifier and filter means supplied by said transformer and coupled to said reflector electrode for regulating the potential of said reflector electrode as required for optimum performance of said Klystron in said mode of oscillation.

7. A source of pulse-modulated ultra high frequency energy, comprising a Klystron oscillator having a cathode and a cavity resonator, means supplying only alternating voltage between said cathode and said resonator for applying to said resonator negative potential throughout one-half of each cycle and positive potential throughout the remainder of each cycle, with respect to said cathode, and means including a reflector electrode aligned with said resonator and said cathode and means supplying it with negative potential for reflecting electrons through said resonator toward said cathode.

CLARENCE C. LUNDY.

REFERENCES CITED

The following references are of record in the file of this patent:

UNITED STATES PATENTS

| Number | Name | Date |
|---|---|---|
| 2,250,511 | Varian et al. | July 29, 1941 |
| 2,269,456 | Hansen et al. | Jan. 13, 1942 |
| 2,281,935 | Hansen et al. | May 5, 1942 |

OTHER REFERENCES

Pierce, "Reflex Oscillators," reprint from Proceedings of the I. R. E., vol. 33, No. 2, February 1945.